(12) United States Patent
Batty, III et al.

(10) Patent No.: US 12,505,110 B2
(45) Date of Patent: Dec. 23, 2025

(54) DYNAMIC MATCHING BASED ON DYNAMIC CRITERIA AND SCORING

(71) Applicant: Disney Enterprises, Inc., Burbank, CA (US)

(72) Inventors: John Robert Batty, III, Winter Garden, FL (US); Jerome Francis Nunziato Dimarzio, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 141 days.

(21) Appl. No.: 17/465,422

(22) Filed: Sep. 2, 2021

(65) Prior Publication Data

US 2023/0063036 A1 Mar. 2, 2023

(51) Int. Cl.
G06F 16/2457 (2019.01)

(52) U.S. Cl.
CPC ............... *G06F 16/24578* (2019.01)

(58) Field of Classification Search
CPC .................................................. G06F 16/24578
USPC ......................................................... 707/723
See application file for complete search history.

(56) References Cited

U.S. PATENT DOCUMENTS

| | | | | |
|---|---|---|---|---|
| 8,117,272 B1* | 2/2012 | Leonard | ................. | G06Q 10/10 709/204 |
| 8,700,644 B1* | 4/2014 | Allen | .................... | H04L 67/535 706/45 |
| 2006/0031087 A1* | 2/2006 | Fox | .......................... | G09B 7/00 705/326 |
| 2009/0164464 A1* | 6/2009 | Carrico | .................. | G06Q 50/10 707/999.005 |
| 2010/0070554 A1* | 3/2010 | Richardson | ........... | H04L 67/306 709/202 |
| 2012/0226743 A1* | 9/2012 | Smargon | .............. | G06Q 20/384 709/203 |
| 2016/0148330 A1* | 5/2016 | Roman | .................... | G09B 7/02 705/326 |
| 2018/0101658 A1* | 4/2018 | Nokuri | .................... | G16H 50/30 |
| 2018/0300818 A1* | 10/2018 | Kabdebon | ............ | G06Q 10/105 |

(Continued)

OTHER PUBLICATIONS

Michalina Malysz, "The Math Behind Online Dating," OKCupid, dated Jun. 8, 2016, pp. 1-4.

(Continued)

*Primary Examiner* — Kimberly L Wilson
(74) *Attorney, Agent, or Firm* — Dorsey & Whitney LLP

(57) ABSTRACT

Techniques for dynamic matching include dynamically defining a first set of queries, including defining a plurality of weights for the first set of queries and defining one or more relationships between queries in the first set of queries. A first set of responses are received from a first participant in a first category of participants. A plurality of additional sets of responses are received from a second category of participants. A plurality of recommendation scores are generated, each corresponding to a potential pairing between the first participant and a participant in the second category of participants. Each respective recommendation score is generated based on: i) a comparison of the first set of responses and one of the additional sets of responses, ii) the defined plurality of weights, and iii) the defined one or more relationships. Matches are identified for the first participant based on the plurality of recommendation scores.

23 Claims, 5 Drawing Sheets

(56) References Cited

U.S. PATENT DOCUMENTS

| | | |
|---|---|---|
| 2018/0302761 A1* | 10/2018 | Rizzolo ............... H04L 12/1822 |
| 2019/0318370 A1* | 10/2019 | Kopikare ................ H04L 67/12 |
| 2019/0373331 A1* | 12/2019 | Benzatti ............ H04N 21/4668 |
| 2020/0279338 A1* | 9/2020 | Strong ................... G06Q 50/01 |
| 2021/0097330 A1* | 4/2021 | Grant ..................... G06N 3/044 |
| 2021/0224342 A1* | 7/2021 | Makani ............... G06F 16/9535 |
| 2022/0114912 A1* | 4/2022 | Mishra ..................... G06N 3/08 |
| 2022/0129816 A1* | 4/2022 | Ralhan ................. G06F 40/295 |

OTHER PUBLICATIONS

Wikipedia, "Gale-Shapley Algorithm," dated Aug. 6, 2021, pp. 1-5.

* cited by examiner

DYNAMIC MATCHING BASED ON DYNAMIC CRITERIA AND SCORING

BACKGROUND

Dynamic matching between different categories of participants is a challenging problem. Existing solutions typically identify a list of matching candidates for a given participant, and allow a participant to select from among the candidates in another category based on the participant's own criteria. But this is inefficient and burdensome for the participant.

SUMMARY

Embodiments include a computer-implemented method. The method includes dynamically defining, using a computer processor, a first set of queries, including: defining a plurality of weights for the first set of queries, and defining one or more relationships between queries in the first set of queries. The method further includes receiving, at the computer processor, a first set of responses to the first set of queries from a first participant in a first category of participants. The method further includes receiving, at the computer processor, a plurality of additional sets of responses to the first set of queries, each additional set of responses being received from one of a plurality of participants in a second category of participants. The second category of participants is distinct from the first category of participants. The method further includes generating, using the computer processor, a plurality of recommendation scores, each respective recommendation score of the plurality of recommendation scores corresponding to a potential pairing between the first participant and one of the plurality of participants in the second category of participants. Each respective recommendation score is generated based on: i) a comparison of the first set of responses and one of the additional sets of responses, ii) the defined plurality of weights, and iii) the defined one or more relationships. The method further includes identifying one or more matches for the first participant, from the plurality of participants in the second category of participants, based on the plurality of recommendation scores.

Embodiments further include a non-transitory computer-readable medium containing computer program code that, when executed by operation of a computer processor, performs an operation. The operation includes dynamically defining a first set of queries, including: defining a plurality of weights for the first set of queries, and defining one or more relationships between queries in the first set of queries. The operation further includes receiving, at the computer processor, a first set of responses to the first set of queries from a first participant in a first category of participants. The operation further includes receiving, at the computer processor, a plurality of additional sets of responses to the first set of queries, each additional set of responses being received from one of a plurality of participants in a second category of participants. The second category of participants is distinct from the first category of participants. The operation further includes generating a plurality of recommendation scores, each respective recommendation score of the plurality of recommendation scores corresponding to a potential pairing between the first participant and one of the plurality of participants in the second category of participants. Each respective recommendation score is generated based on: i) a comparison of the first set of responses and one of the additional sets of responses, ii) the defined plurality of weights, and iii) the defined one or more relationships. The operation further includes identifying one or more matches for the first participant, from the plurality of participants in the second category of participants, based on the plurality of recommendation scores.

Embodiments further include a system, including a computer processor, and a memory having instructions stored thereon which, when executed on the computer processor, performs an operation. The operation includes dynamically defining a first set of queries, including: defining a plurality of weights for the first set of queries, and defining one or more relationships between queries in the first set of queries. The operation further includes receiving, at the computer processor, a first set of responses to the first set of queries from a first participant in a first category of participants. The operation further includes receiving, at the computer processor, a plurality of additional sets of responses to the first set of queries, each additional set of responses being received from one of a plurality of participants in a second category of participants. The second category of participants is distinct from the first category of participants. The operation further includes generating a plurality of recommendation scores, each respective recommendation score of the plurality of recommendation scores corresponding to a potential pairing between the first participant and one of the plurality of participants in the second category of participants. Each respective recommendation score is generated based on: i) a comparison of the first set of responses and one of the additional sets of responses, ii) the defined plurality of weights, and iii) the defined one or more relationships. The operation further includes identifying one or more matches for the first participant, from the plurality of participants in the second category of participants, based on the plurality of recommendation scores.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
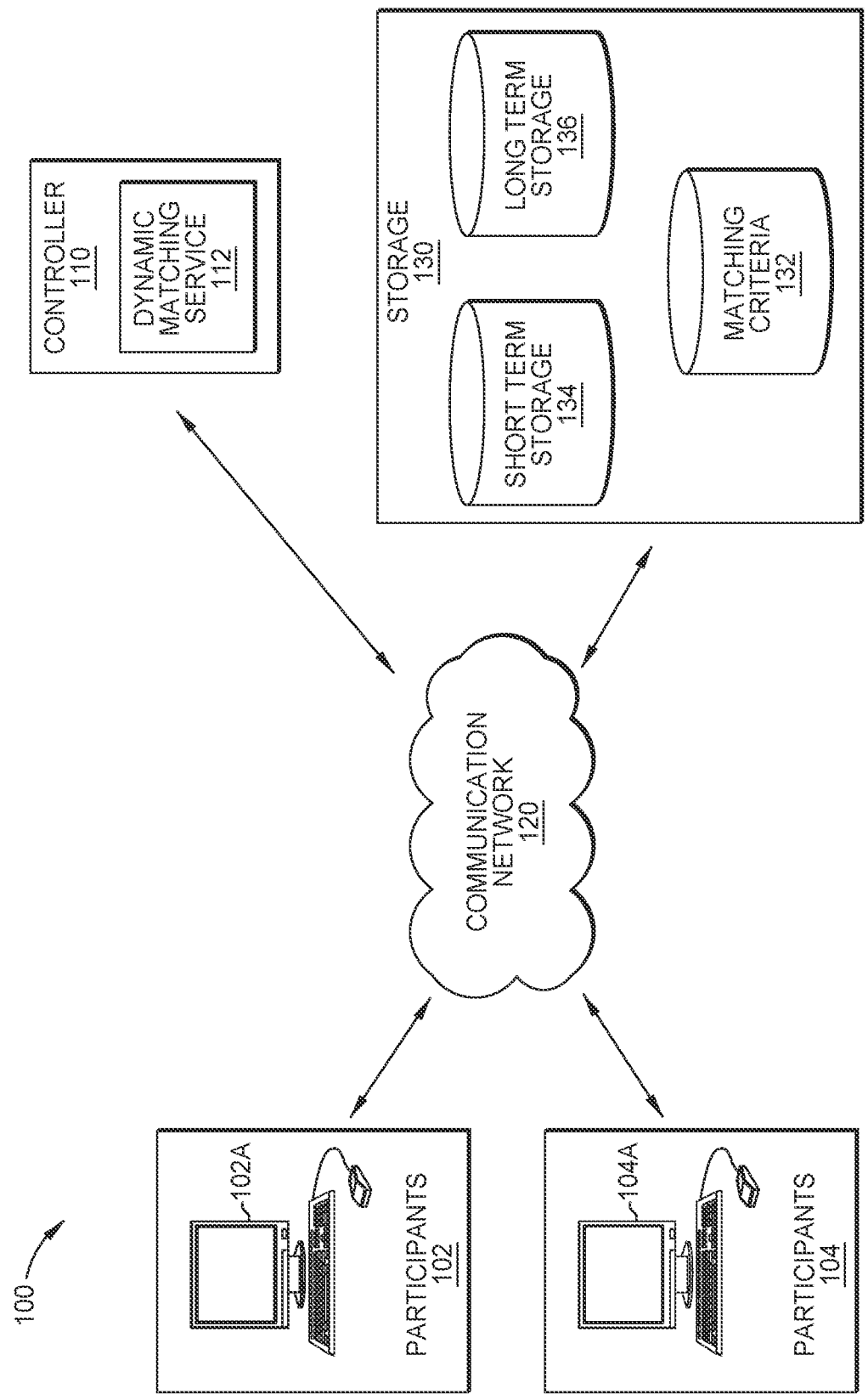
FIG. 1 illustrates a system for dynamic matching between categories of participants, according to one embodiment.

In an embodiment, different categories of participants can be dynamically matched by generating a recommendation score for each potential pairing. For example, one category of participants could be mentors (e.g., for a business or educational institution). Another category of participants could be mentees, to match with the mentors. In an embodiment, a recommendation score for each mentor/mentee pairing can be dynamically generated using a sophisticated recommendation engine tied to an electronic database (e.g., a relational database). For example, a dynamic set of queries can be answered by multiple people (e.g., multiple mentors, mentees, or both) and the recommendation engine can assign a weighted recommendation score based on a pair of participants' answers to the queries.

In an embodiment, any number of criteria or queries for generating the recommendation score can be used. Further, the criteria or queries can be generated, or modified, by participants (e.g., by mentors or mentees or both). In an embodiment, the criteria used to generate the recommendation score for dynamic matching can, itself, be dynamic. This can allow the criteria to change for different applications and as an application progresses.

In an embodiment, generating the recommendation scores using the recommendation engine can be computationally expensive. In one solution, the recommendation engine could generate the recommendation scores for each pairing of participants (e.g., for each mentor/mentee pair) at the time that all participants have concluded their battery of queries (e.g., after a required deadline has passed). But this may not be desirable for large numbers of participants, because it can overwhelm the electronic systems by requiring a very large number of computations and storage actions in a short period of time.

In an embodiment, the recommendation engine can solve this problem by generating recommendation scores for a given participant in one category, and every participant in another category, dynamically at the time the participant completes the queries or criteria. For example, at the time a given mentee completes a battery of queries, the recommendation engine can dynamically generate a recommendation score for that mentee and each available mentor. The recommendation engine can then record this score in a suitable portion of an electronic database. While this may create more computations overall (e.g., by requiring multiple computations for a given pairing of participants if either of the participants modifies their answers), it can provide a significant technical improvement by spacing out the computations and storage actions (e.g., database commits or writes to persistent storage). Rather than being overwhelmed by a large number of computations or storage actions in a short period of time (e.g., after all participants have concluded answering their battery of queries), the recommendation engine can generate recommendation scores as participants answer queries.

FIG. 1 illustrates a system 100 for dynamic matching between categories of participants, according to one embodiment. The system 100 includes, in the illustrated embodiment, a first set of participants 102 and a second set of participants 104. The first set of participants 102 share at least one role with respect to a relationship between the first set of participants 102 and the second set of participants 104. The second set of participants 104 share at least one role (different from the at least one role shared by the first set of participants 102) with respect to the relationship between the first set of participants 102 and the second set of participants 104. The relationship can be, for example, a professional relationship, an academic relationship, a friendship or social relationship, a romantic relationship, etc. In an embodiment, as discussed further below, the first set of participants 102 share the role of mentor (hereinafter "mentors 102") and the second set of participants 104 share the role of mentee (hereinafter "mentees 104"). The mentors 102 and the mentors 104 can represent any number of mentors and mentees for dynamic matching (e.g., one or more mentors and one or more mentees). The illustration of mentors 102 and mentees 104 is merely one example, and any suitable categories or participant roles can define the first set of participants and the second set of participants. Further, in an embodiment more than two categories or participant roles can be included, with each category or participant role corresponding to a different set of participants.

The mentors 102 and the mentees 104 interact with the system 100 using computing devices (e.g., computing devices 102A and 104A) and communication network 120. The computing devices 102A and 104A can be any suitable computing devices, including laptop computers, desktop computers, smartphones, tablets, internet of things (IoT) devices, or any other suitable computing devices.

The communication network 120 can be any suitable communication network, including the Internet, a local area network (LAN), a wide area network (WAN), a cellular network, or any other suitable communication network. Further, the computing devices 102A and 104A can communicate with the communication network 120 using any suitable network connection, including a wired connection (e.g., an Ethernet connection), a wireless connection (e.g., a WiFi connection), a cellular connection, or any other suitable network connection.

The system further includes a controller 110 and a dynamic matching service 112. In an embodiment, the controller 110 also communicates with the communication network 120. For example, the mentors 102 and the mentees 104 can communicate with the controller 110 using the communication network 120. In an embodiment, the dynamic matching service 112 facilitates dynamic matching between the sets of participants (e.g., between the mentors 102 and mentees 104). For example, the dynamic matching service 112 can use matching criteria 132 to dynamically generate a recommendation score for each pairing of an individual mentor 102 and an individual mentee 104. In an embodiment, matching criteria 132 can include queries, responses, defined relationships between queries and responses, defined weights for queries and responses, and any other suitable criteria. This is merely one example, and is discussed further below with regard to FIGS. 2-6.

The system 100 further includes a storage 130. In an embodiment, the storage 130 is an electronic database (e.g., a relational database, a graph database, or any other suitable electronic database) in communication with the communication network 120. Alternatively, or in addition, the storage 130 can be a suitable cloud storage location (e.g., a public cloud, a private cloud, or any other suitable cloud storage location). These are merely examples, and the storage 130 can be any suitable storage, including a local storage, a remote storage maintained by the entity performing the dynamic matching (e.g., by an employer or educational institution matching the mentors 102 and mentees 104), or any other suitable storage.

In an embodiment, the storage 130 includes matching criteria 132. As discussed further below with regard to FIGS. 3-6, the matching criteria 132 can include queries and responses, including multiple choice questions (e.g., for answering by the mentors 102, the mentees 104, or both), items for ranking (e.g., to compare rankings between the mentors 102 and the mentees 104), items for selection (e.g., select a predetermined number of items among a larger list of items) or any other suitable queries and responses. The matching criteria 132 can further include relationships and weights relating to the queries and responses, and any other suitable criteria. The matching criteria 132 can be generated, and modified, dynamically by any suitable entity, including a human program manager, an automated system (e.g., a machine learning system or any other automated system), mentors 102, mentees 104, or combinations thereof. In an embodiment, the dynamic matching service 112 can be configured to control which entities are permitted to generate or modify which matching criteria. For example, some matching criteria may only be generated or modified by mentors 102, or by a subset of mentors 102, and not by mentees 104.

In an embodiment, the storage 130 further includes short term storage 134 (e.g., cache storage) and long term storage 136. In an embodiment, the short term storage 134 is used to store matching information (e.g., recommendation scores) for ongoing matches between sets of participants (e.g., between mentors 102 and mentees 104). As noted above, in an embodiment, the dynamic matching service 112 generates dynamic matches between sets of participants (e.g., by using the matching criteria 132 to dynamically generate a recommendation score for each pairing of a mentor 102 and a mentee 104). In an embodiment, each time a participant (e.g., one of the mentors 102 or one of the mentees 104) completes matching criteria 132, the dynamic matching service 112 computes a recommendation score for that participant against each participant in the other set of participants.

For example, assume a first mentee in the mentees 104 completes all of the matching criteria 132 (e.g., answers all queries and/or completes all item rankings). In an embodiment, the dynamic matching service 112 computes a recommendation score for the first mentee against each mentor in the mentors 102 who has also completed the matching criteria 132. The dynamic matching service 112 stores these recommendation scores in the short term storage 134, and updates the recommendation scores in the short term storage 134 each time the first mentee changes a response to a matching criteria 132 or responds to a new matching criteria, or each time a mentor in the mentors 104 completes the matching criteria 132 or changes a response to a matching criteria 132.

In an embodiment, the long term storage 136 includes matching information (e.g., recommendation scores) for completed pairings (e.g., all possible pairings) between categories of participants (e.g., between mentors 102 and mentees 104). For example, as discussed below, a defined period (e.g., a deadline) can be set for mentors 102 and mentees 104 to respond to the matching criteria 132 (e.g., two weeks). After this period has been completed, the mentors 102 and the mentees 104 can be locked out of responding to or changing responses to the matching criteria 132. At this point, the matching information can be stored in the long term storage 136.

In an embodiment, it is cheaper, monetarily, to store large amounts of data in the long term storage 136, but more computationally expensive to modify data stored in the long term storage 136. It is less computationally expensive to modify data stored in the short term storage 134, but more monetarily expensive to store large amounts of data in the short term storage 134. The short term storage 134 can remain persistent during the period where the matching information may be modified (e.g., during a two week response period for the mentors 102 and the mentees 104), but can be cleared after that period ends and the matching information is stored in the long term storage 136.

This has the technical advantage of allowing storage of frequently modified data in less computationally expensive storage (e.g., short term storage 134) while avoiding unnecessary expense by moving the data to more computationally expensive, but monetarily cheaper, storage (e.g., long term storage 136) after data is less likely to be modified (e.g., after participants may no longer respond to matching criteria). This is merely one example, and instead, in other examples, the matching information (e.g., recommendation scores and any other suitable information) can always be stored in the short term storage 134 or the long term storage 136 (e.g., the storage 130 may include only a single type of storage (i.e., the short term storage 134 or the long term storage 136)).

Figure 2:
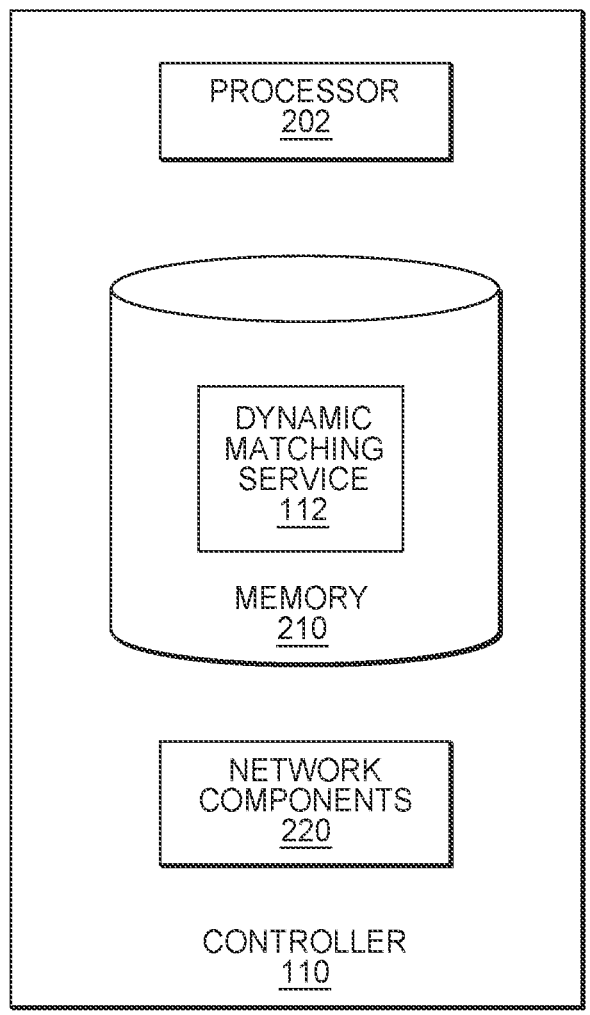
FIG. 2 illustrates a controller with a dynamic matching service, according to one embodiment.

FIG. 2 illustrates a controller 110 with a dynamic matching service 112, according to one embodiment. The controller 110 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller 110 to interface with a suitable communication network (e.g., the communication network 120 illustrated in FIG. 1). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 110. The program code is generally described as various functional "applications" or "modules" within the memory 210, although alternate implementations may have different functions and/or combinations of functions. Within the memory 210, the dynamic matching service 112 facilitates dynamic matching among sets of participants (e.g., mentors 102 and mentees 104). This is discussed further below with regard to FIGS. 3-6.

Figure 3:
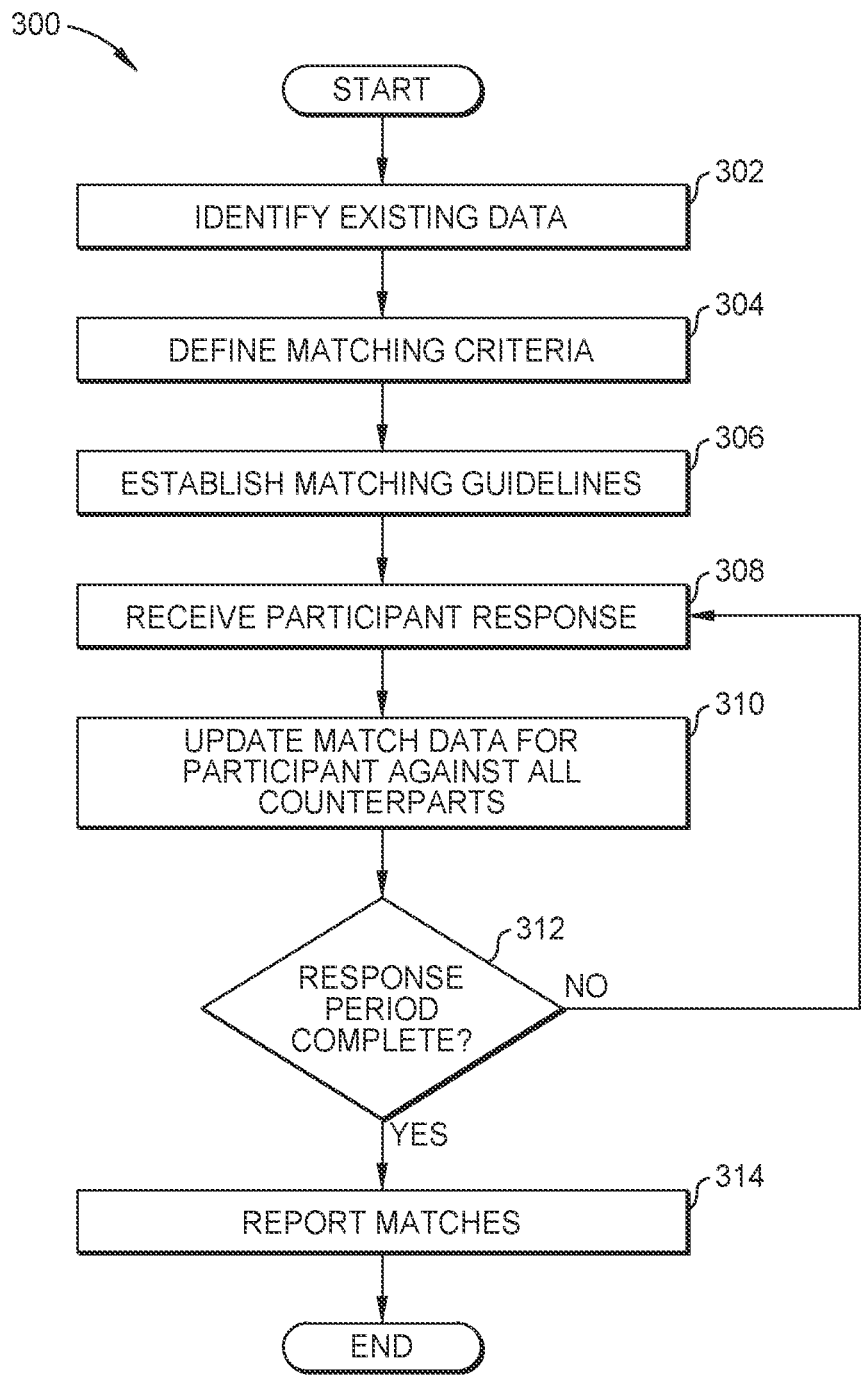
FIG. 3 is a flowchart for dynamic matching between categories of participants, according to one embodiment.

FIG. 3 is a flowchart 300 for dynamic matching between sets of participants, according to one embodiment. At block 302, a dynamic matching service (e.g., the dynamic matching service 112 illustrated in FIGS. 1 and 2) identifies existing data. For example, the dynamic matching service can identify any existing participants (e.g., mentors 102 and mentees 104, illustrated in FIG. 1), any existing matching criteria (e.g., matching criteria 132 illustrated in FIG. 1), and any previously generated matching information (e.g., accrued matches stored in the short term storage 134 illustrated in FIG. 1).

In an embodiment, each participant (e.g., each of the mentors 102 and the mentees 104) has an associated participant profile. The participant profile can reflect biographical information for the participant (e.g., major and year in school for a student, current department and position for an employee of a business) and/or demographic information for the participant (e.g., age, race, ethnicity, gender, marital status, etc.). In an embodiment, each participant can be asked to complete the participant profile before completing the matching criteria. Alternatively, the participant profile can be populated using data from one or more existing data sources (e.g., existing student or personnel directories maintained by the educational institution or business, participant resumes, participant social media profiles, etc.).

At block 304, the dynamic matching service defines matching criteria. For example, a suitable human user (e.g., a program manager or a participant) can generate queries and possible responses for the participants to answer (e.g., for queries with defined responses). The user can further define relationships between the queries and responses, or perform any other action relating to defining matching criteria. Alternatively, or in addition, an automated system (e.g., a trained machine learning model) can be used to define matching criteria. This is discussed further below with regard to FIG. 4.

At block 306, the dynamic matching service establishes matching guidelines. For example, the dynamic matching service can perform one or more of the following actions: limit which participants can be matched across sets/categories of participants (e.g., which mentors are eligible to be matched with a given mentee or group of mentees), establish a lock out period during which participants may not respond to or modify responses to matching criteria, define a number of matches for each participant, or define a time out period (e.g., a time period after which a matching request from one set of participants to another set of participants will be automatically denied). This is discussed further with regard to FIG. 5.

At block 308, the dynamic matching service receives a participant response to the matching criteria. For example, the dynamic matching service can receive a response from a given participant (e.g., one of the mentors 102, or the mentees 104, illustrated in FIG. 1) to a query included in the matching criteria (e.g., the matching criteria 132 illustrated in FIG. 1). In an embodiment, the dynamic matching service receives responses to all currently existing matching criteria for the participant (e.g., a response to each available query). Alternatively, the dynamic matching service receives a response to a subset (less than all) of currently existing matching criteria for the participant (e.g., a response to one query of five available queries, responses to two queries of five available queries, etc.).

At block 310, the dynamic matching service updates match data for the participant against all counterparts in one or more other sets of participants. For example, assume the participant for whom a response was received at block 308 is a first mentee. At block 310, the dynamic matching service updates the match data (e.g., a recommendation score) corresponding to the first mentee and every mentor (e.g., counterpart participant) who had responded to the matching criteria (e.g., the mentors 102 who have responded to the matching criteria 132). In an embodiment, the dynamic matching service stores the match data in a cache or other short term storage location (e.g., short term storage 134). This is discussed in more detail with regard to FIG. 6.

At block 312, the dynamic matching service determines whether the response period is complete. As discussed above, in an embodiment the participants are given a defined period in which to complete the matching criteria (e.g., two weeks). After that period expires, the participants are not permitted to add or modify their responses to the matching criteria.

In an embodiment, the response period can itself be dynamic. For example, a user could initially set the response period to two weeks. But if a required number, or percentage, of participants in a given category have not responded to the matching criteria in that response period, the dynamic matching service can extend the response period. In an embodiment, the user can define when the response period should be extended (e.g., by providing threshold values or percentages at which the response period is extended).

Returning to block 312, the dynamic matching service determines whether that response period is complete. If not, the flow returns to block 308 and the dynamic matching service waits to receive a further participant response (e.g., from a new participant, the first mentee modifying one or more responses, or any other existing participant modifying one or more responses). If so, the flow proceeds to block 314. In an embodiment, blocks 308-312 are repeated for each participant in the sets of participants. Further, in an embodiment, this can be done in parallel (e.g., for multiple participants simultaneously), serially (e.g., for one participant after another), or a combination of both.

At block 314, the dynamic matching service reports matches. In an embodiment, the dynamic matching service can notify participants (e.g., who have completed the matching criteria) of the match data. For example, the dynamic matching service can notify each mentee of the mentor(s) with the highest recommendation score corresponding to that mentee. In an embodiment, the dynamic matching service can provide the participant with an indication of the relative strength of each match (e.g., a percentile rank, a score value, or any other suitable indication).

Alternatively, or in addition, the dynamic matching service can provide the participant with a list of top matches (e.g., the top match, the top three matches, the top five matches, etc.) without any other indication of the relative strength of the match. In an embodiment, the dynamic matching service provides the notification through any suitable technique (e.g., electronic mail, a smartphone or tablet app, an SMS message, a webpage, an automated telephone call, or any other suitable technique) using a suitable user interface.

Further, the dynamic matching service can present a user interface to the participant reflecting the responses by each potential match. For example, as noted above, some matching queries can include free form responses. In an embodiment, these free form responses are not used when generating a recommendation score, but can be presented to the participant to assist the participant in selecting a match. In an embodiment, the user interface can present side by side comparisons of the response to each query by each potential match, for the participant.

As discussed above, in an embodiment the dynamic matching service reports possible matches to each participant and the participant selects a match. A participant can then select a preferred match. For example, a participant can select an identified top match, as recommended by the dynamic matching service. But this is just one option. In an embodiment a participant can select any preferred match, whether recommended by the dynamic matching service or not.

Alternatively, or in addition, the dynamic matching service can automatically select a match for each participant. For example, the dynamic matching service can automatically select the eligible match with the highest recommendation score, for each participant. In an embodiment, the dynamic matching service can then transmit a match request from the participant to the eligible match. Alternatively, the dynamic matching service can automatically complete the match.

In an embodiment, the dynamic matching service further reports match requests (e.g., from a participant in one set of participants, a requestor, to a participant in another set of participants, a requestee), match acceptances, and match rejections. For example, the dynamic matching service can notify requestees of requests, and can notify requestors of request acceptances or rejections. Further, the dynamic matching service can complete matches (e.g., when a requestee accepts a match from a requestor).

Figure 4:
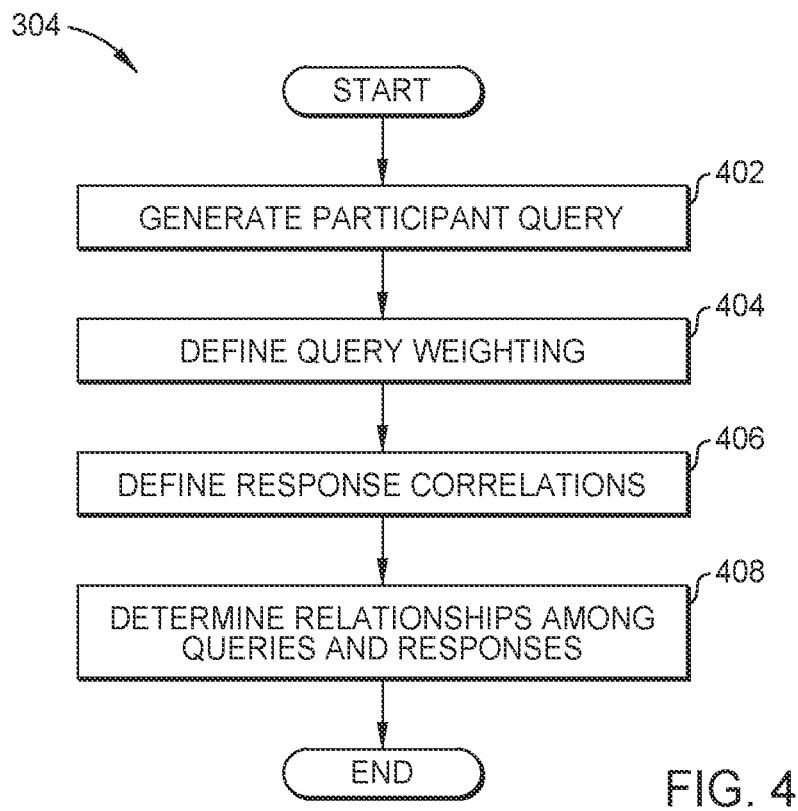
FIG. 4 is a flowchart for defining matching criteria for dynamic matching between categories of participants, according to one embodiment.

FIG. 4 is a flowchart for defining matching criteria for dynamic matching between sets or categories of participants, according to one embodiment. In an embodiment, FIG. 4 corresponds with block 304 illustrated in FIG. 3. At block 402, a dynamic matching service (e.g., the dynamic matching service 112 illustrated in FIGS. 1 and 2) generates a participant query. As discussed above, in an embodiment numerous matching criteria (e.g., matching criteria 132 illustrated in FIG. 1) can be used to dynamically match participants from different sets or categories (e.g., mentors 102 and mentees 104 illustrated in FIG. 1).

These matching criteria can include queries and responses. For example, the matching criteria can include multiple choice questions for a participant. These multiple choice questions can require one response (e.g., "What, from among the choices below, is your favorite color?"), or multiple responses (e.g., "Which languages do you speak (select all that apply)?"). As another example, the matching criteria can include ranking queries for a participant. For example, a participant could be asked to rank a list of five items from most preferred to least preferred. As another example, the matching criteria can include a query with a free form or fill-in-the-blank (e.g., not multiple choice) response requested. In an embodiment, responses to free form queries are not used to identify matches (e.g., not used to generate a recommendation score) but can be presented to the participant when selecting among matches (e.g., as discussed above in relation to block 314 illustrated in FIG. 3). Alternatively, or in addition, responses to free form queries are parsed and used to identify matches. For example, suitable natural language processing techniques (e.g., a suitable machine learning model) could be used to identify matching free form responses. In an embodiment, the impact of matching free form responses on a recommendation score could vary depending on a confidence score relating to the match. For example, where the dynamic matching service is more confident in a match between free form responses (e.g., based on natural language processing) the match could have more impact on the recommendation score.

In an embodiment, the dynamic matching service can receive the query from a number of different sources. For example, a human program manager can generate queries. As another example, one or more of the participants can generate queries. For example, mentors, or a subset of mentors, could be allowed to generate queries. In an embodiment, the dynamic matching service can control which participants, or groups of participants, are permitted to generate queries.

In an embodiment, the dynamic matching service can present a suitable user interface to allow the user (e.g., the program manager or participant) to generate the query. For example, the user interface could include an interface to generate a multiple choice query (e.g., an interface to add a query and the possible responses). This user interface could allow the user to select whether a participant provides one response to the query, or multiple responses to the query. Similarly, the user interface could allow a user to enter a list of items for a participant to rank.

Alternatively, or in addition, an automated source could be used to generate participant queries. For example, a suitable machine learning model could be trained to generate queries based on the categories of participants. In this example, the machine learning model could be trained using prior queries presented by similar categories of participants (e.g., mentors and mentees for different entities than the subject entity). These are merely examples, and the dynamic matching service can receive the query from any suitable source.

Further, in an embodiment, the dynamic matching service can define whether a given query should be presented to all sets or categories of participants, or just some categories of participants. For example, a user could intend a particular query to be presented only to mentors. The dynamic matching service can define that query as presented only to mentors, and not to mentees.

At block 404, the dynamic matching service defines query weighting. In an embodiment, different queries can be assigned different weights in generating a recommendation score. These weights can be relative (e.g., between queries) or absolute. For example, a user could determine that a particular query should be given twice as much weight as another query. Alternatively, the user could determine that a particular query should be weighted as 5% of the overall recommendation score. The dynamic matching service defines this weighting, and then uses it to calculate the recommendation score.

At block 406, the dynamic matching service defines response correlations. For example, the dynamic matching service can receive from a user (or an automated source) a correlation of which responses match across categories of participants (e.g., receiving full points in the recommendation score), which responses partially match (e.g., receiving partial points in the recommendation score), and which responses do not match (e.g., receiving no points in the recommendation score). For example, a user could define the response options for a "Favorite Color" query as red, blue, yellow, green, orange, and purple. The user could instruct the dynamic matching service that responses qualify as positive, neutral, or negative. A positive response (e.g., matching the same color) could be assigned full points. A neutral response (e.g., a similar color as defined by the user or automated source such as warm colors (red, orange, and yellow), cool colors (blue, green, and purple), primary colors (red, blue, and yellow), secondary colors (green, orange, and purple)) could be assigned partial (or full) points. A negative response (e.g., a disparate color as defined by the user or automated source (e.g., red and green)) could be assigned 0 points.

As another example, a query could ask participants how important another query is to that participant. For example, a recommendation query could ask the home state or region of a participant. Another query could ask whether a participant wishes to only be matched with participants in another category from the same home state or region as the participant, wishes to be only matched with participants in another category from a different home state or region, or does not care.

The dynamic matching service can modify which responses qualify as positive, negative, or neutral based on the participant's response to the related query, and can modify the weight allocated to the "home state or region" query, based on the participant's response to the related query. For example, assume that a participant indicates that they do not care about the home state or region of potential matches. All responses to the query about home state or region could be defined as neutral, and the weight of that query could be reduced (or eliminated).

As another example, if a query requires a ranked list items from the participants, each participant could be provided points based on how many items match, how close the non-matching items that are ranked similarly are, which items match, or all of the above. Further, the dynamic matching service can define matches across different queries. For example, the dynamic matching service can define a given response to one query as a match to a different response to a different query.

As another example, the dynamic matching service can receive from a user (or an automated source) information reflecting how matching preferences in a list of items should impact overall dynamic matching. In this example, the user could instruct the dynamic matching service how positive matches between participants should impact a recommendation score (e.g., how much the score should be increased), how much a neutral match should impact the recommendation score (e.g., no change or an increase to the recommendation score less than the increase associated with a positive match), and how much a negative match should impact the recommendation score (e.g., how much, or if, the recommendation score should be decreased).

At block 408, the dynamic matching service can determine relationships among queries and responses. In an embodiment, a participant could be presented with different queries, or different response options, based on the participant's prior responses. For example, assume a participant is presented with a query asking the participant which language(s) the participant speaks. If a participant selects a particular language, the participant could be presented with another query asking the participant which dialect(s) of that language the user is most comfortable with. In an embodiment this can be defined by a user generating the query and responses (e.g., a program manager or participant) or by an automated system.

Further, in an embodiment, the dynamic matching service can dynamically modify relationships between queries and responses as the matching criteria change. For example, a user could enter a new query and response into an existing battery of matching criteria. The dynamic matching service can modify existing matching criteria information (e.g., query weighting information, query responses, etc.) based on this new query and response.

For example, a user in an educational institution could define a matching query asking whether a mentee wishes to have a mentor with the same major as the mentee. A user could then add a new query asking whether a mentor wishes to have a mentor with a similar major to the mentee (e.g., a major relating to the same category of subject matter). The response to a query about the mentor's major could be provided with maximum points if the mentor's major matches the mentee, with some but not maximum points (e.g., partial points) if the mentor's major is similar to the mentee (e.g., different types of engineering majors or different types of science majors), but not exactly the same, and with no points if the mentor's major is not the same type as the mentee.

Figure 5:
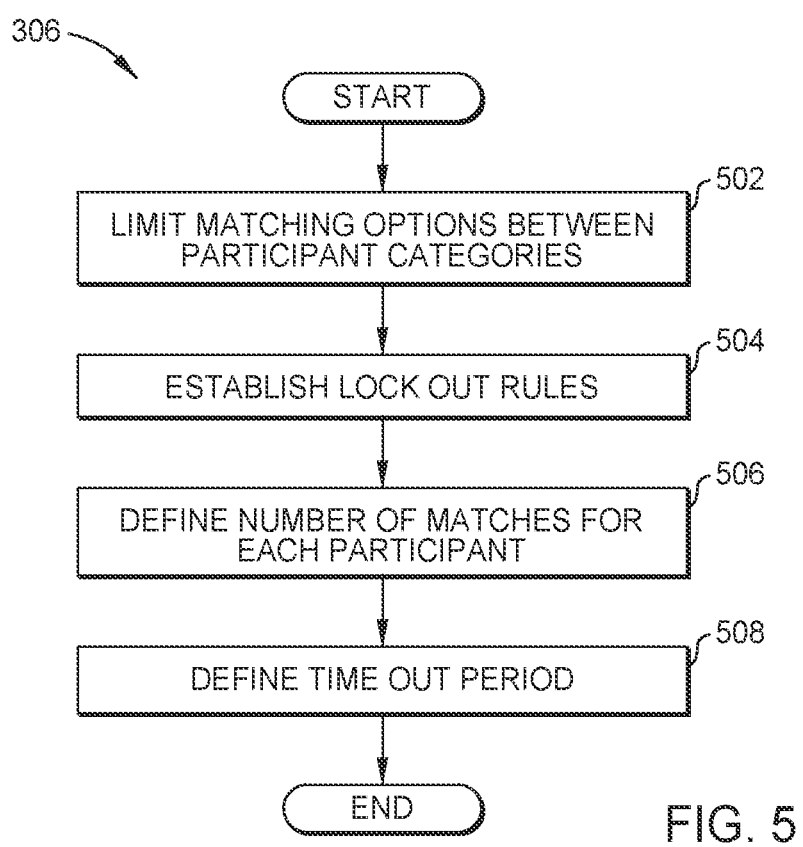
FIG. 5 is a flowchart for establishing matching guidelines for dynamic matching between categories of participants, according to one embodiment.

FIG. 5 is a flowchart for establishing matching guidelines for dynamic matching between sets or categories of participants, according to one embodiment. In an embodiment, FIG. 5 corresponds with block 306 illustrated in FIG. 3. At block 502, a dynamic matching service (e.g., the dynamic matching service 112 illustrated in FIGS. 1 and 2) limits matching options between participant sets or categories. In an embodiment, only a subset of participants in a given set or category are permitted to match with a given participant in another set or category, based on characteristics of the participants. For example, in an educational context, a mentor for a given student could be required to be at least one grade level, but not more than three grade levels, senior to the student. A user (e.g., a program manager or participant), or an automated source, can provide this rule to the dynamic matching service (e.g., using a suitable user interface), and the dynamic matching service can enforce the rule.

For example, the dynamic matching service may not generate a recommendation score between participants who are not permitted to match. Alternatively, the dynamic matching service can generate recommendation scores, but bar the disallowed matches from being presented to participants (e.g., the dynamic matching service can use a flag or property associated with the match to identify that the match is not permitted). This may be preferable, for example, where the rules on matching are likely to change, because match scores will be generated for all possible matches, and so any change in rules can be reflected merely by modifying the associated flag or property without requiring the dynamic matching service to generate a large number of new recommendation scores.

At block 504, the dynamic matching service establishes lock out rules. In an embodiment, as discussed above, matching criteria are permitted to be modified dynamically at any time. This may not be desirable, however, where one or more participants have begun responding to matching criteria queries, because it could result in inconsistent responses between participants based on differing queries or could require participants to interact with the system multiple times to address changes in queries. It may be more desirable to establish a lock out for a given query (or group of queries or all queries) once a participant has begun responding to the query. This would bar modification of the query once any participant has responded to the query. At block 504 the dynamic matching service can receive (e.g., from a user or an automated source) instructions as to desired lock out rules. As discussed above, this is merely one embodiment (e.g., it is an optional step that may be omitted), and instead, the queries could also be modified dynamically at any time (e.g., with no lock out rules).

The dynamic matching service can further establish lock out rules based on timing. For example, the dynamic matching service can bar modification of matching criteria queries and responses after a particular date and time, before a particular date and time, or during a defined interval. This could, for example, bar modification after a time period for participants to begin responding to queries has begun.

At block 506, the dynamic matching service defines the number of matches for each participant. As discussed above in relation to block 314, in an embodiment, the dynamic matching service reports to each participant the participant's most likely matches. The dynamic matching service can define how many match options each participant is presented with (e.g., any integer such as 1, 3, 5). The dynamic matching service can further define how many match requests each participant may receive. For example, a given mentor may only be permitted to receive a specified number of requests from mentees. At block 506, the dynamic matching service can identify whether the mentor has already received the maximum number of allowed match requests, and if so can avoid presenting the mentor as a potential match to mentees.

In an embodiment, the dynamic matching service can further define how many actual matches each participant is permitted (e.g., in addition to, or instead of, defining the maximum number of match requests). For example, each mentor may only be permitted to match with two mentees. At block 506, the dynamic matching service can identify whether a given mentor already has two mentees (e.g., based on information stored in a suitable storage location) and can avoid presenting such a mentor as a match option to mentees. In an embodiment, these parameters can be configured by a user (e.g., a program manager or participant) or an automated source. Further, the dynamic matching service can specify that particular participants are not eligible for matching (e.g., for a temporary period) and can exclude those participants from the matching options for other categories of participants.

In an embodiment, the dynamic matching service can track the number of participants in a given category who are not eligible for further matches, and can attempt to correct any deficiency. For example, if each mentor is allowed only two mentees, and the dynamic matching service determines that a threshold number (or percentage) of mentors cannot take on new matches, the dynamic matching service can send reminders to remaining mentors requesting that the mentors complete the matching criteria queries. Further, the dynamic matching service can provide program-wide reports, reflecting total participants, match percentages, and other suitable information.

At block 508, the dynamic matching service defines a time out period. For example, as discussed above in relation to block 314, in an embodiment the dynamic matching service reports to each participant the participant's most likely matches. In an embodiment, a participant can select a preferred match. The participant's preferred match can then be notified of that selection, and can be given a time period to respond. For example, a given mentee could be provided with a list of three suitable mentors. The mentee could select one of the mentors. The mentor could be notified of this selection, and asked whether they agree to act as a mentor for the mentee. If the mentor does not respond within a given time out period (e.g., one week), the mentee can be asked to select another mentor. The time out period can be configured by a user (e.g., a program manager or participant) or an automated source.

Figure 6:
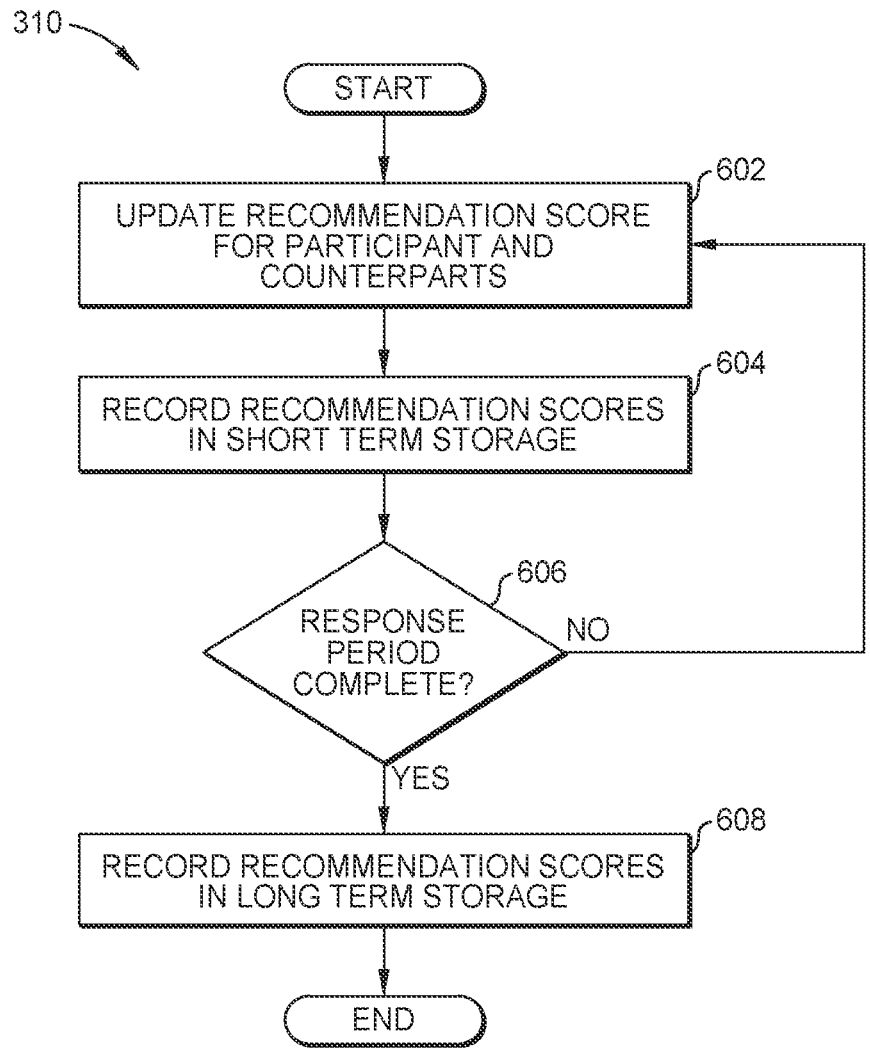
FIG. 6 is a flowchart for updating participant matches for dynamic matching between categories of participants, according to one embodiment.

FIG. 6 is a flowchart for updating participant matches for dynamic matching between sets or categories of participants, according to one embodiment. In an embodiment, FIG. 6 corresponds with block 310 illustrated in FIG. 3. At block 602 a dynamic matching service (e.g., the dynamic matching service 112 illustrated in FIGS. 1 and 2) updates a recommendation score for a participant (e.g., the participant for which a response was received at block 308 illustrated in FIG. 3) and the participant's counterparts. In an embodiment, participants within a given set or category are not scored or ranked against each other. Participants are only scored against counterparts (e.g., participants in another set or category). For example, mentors are not scored or ranked against other mentors; they are only scored against mentees.

In an embodiment, the dynamic matching service updates the recommendation score for the given participant against all participants in the counterpart set or category. For example, assume that the dynamic update service receives a response from a mentee. At block 602, the dynamic update service updates the recommendation score for that mentee and all mentors who have entered matching criteria information (e.g., all mentors who have responded to matching criteria queries).

In an embodiment, this is a technical improvement over alternative techniques (e.g., updating recommendation scores for all mentors and mentees after a response period has closed and no further modifications are expected). While updating a recommendation score for a participant against all counterparts after the participant completes their recommendation criteria may create more computations overall (e.g., by requiring multiple computations for a given pairing of participants if either of the participants modifies their answers), it can provide a significant technical improvement by spacing out the computations required to calculate a recommendation score and spacing out database or other storage actions required to record the recommendation score. Rather than being overwhelmed by a large number of computations or storage actions in a short period of time (e.g., immediately after the period during which participants are permitted to respond to recommendation criteria queries has completed), the dynamic matching service can generate recommendation scores as participants answer queries.

In an embodiment, the recommendation score can be calculated using the following techniques, which use mentors and mentees as example participant sets or categories. The recommendation score first includes a number of inputs. Assume the matching criteria (e.g., the matching criteria 132 illustrated in FIG. 1) include n total queries. The score weight per query (n)=w, where $\Sigma_{n=1}^{n} w = \lim(100)$. The rank match (r) is $$\sum\nolimits_{M(n)=m(n)}^{n} r + 1 = \lim (R_n) \to \sum\nolimits_{M(n) \neq m(n)}^{n} r + 0.5 = \lim \left(\frac{R_n}{2}\right),$$

where the total number of items to rank is represented by $R_n$, the mentor category is represented by M and the mentee category is represented by m. Further, if a given query $q_1(a)$ affects the scoring of another query $q_2(a)$, then the match between Mentee($q_1(a) \sim q_2(a)$) and Mentor($q_1(a) \sim q_2(a)$) can be assigned a component (c) of: (1) positive (e.g., 1 point), (2) neutral (e.g., 1 point or 0.5 points), or negative (0 points).

Given the inputs above, the recommendation score can be calculated using this equation. For each M~m pair: (((M($q_1$(a)~$q_2$(a))~m($q_1$(a)~$q_2$(a)))c*100)/Qn)*100*w+((r*100)/$R_n$)*100*w. That is, for each query answered by both the Mentor and Mentee (in each Mentor/Mentee pair) a score of 1, [1 or 0.5], or 0 is assessed based on if the answers are Positive, Neutral, or Negative respectively (e.g., in one embodiment a neutral answer is assigned a score of 1, in another a neutral answer is assigned a score of 0.5). The score is then multiplied by 100 and divided by the total possible query score to obtain the base query score. Multiplying the base query score by 100 and then by the query weighting factor will yield the weighted score per query. The ranking query score is multiplied by 100 and divided by the total possible rank matching score. This total is multiplied by 100 and then by the rank matching weighting factor. This will yield the weighted rank matching score. The sum of weighted score per query and the weighted rank matching score produces the recommendation score for each Mentor/Mentee pair.

At block 604, the dynamic matching service records the recommendation scores in short term storage (e.g., short term storage 134 illustrated in FIG. 1). In an embodiment, as discussed above, it is less computationally expensive to modify, but more monetarily expensive to store large amounts of data in short term storage, as compared to longer term storage (e.g., an electronic database). In an embodiment, the short term storage is persistent (e.g., a suitable persistent cache storage).

At block 606, the dynamic matching service determines whether the response period for participants is complete. As discussed above, in an embodiment the participants are given a defined period in which to complete the matching criteria (e.g., two weeks). After that period expires, the participants are not permitted to add to, substitute, delete, or otherwise modify their responses to the matching criteria. If the response period has not expired, the flow returns to block 602 and the dynamic matching service updates recommendation scores for the next participant from whom a response is received. If the response period has expired, the flow proceeds to block 608.

At block 608, the dynamic matching service records the recommendation scores (e.g., for all participants) in long term storage (e.g., long term storage 136 illustrated in FIG. 1). In an embodiment, it is cheaper, monetarily, to store large amounts of data, but more computationally expensive to modify the data stored in long term storage, as compared to short term storage. Storing the recommendation scores in short term storage during the response period (e.g., when responses may be modified) and in longer term storage after the response period is complete (e.g., when responses are unlikely to be modified) has the technical advantage of allowing storage of frequently modified data in less computationally expensive, but more monetarily expensive, storage (e.g., short term storage) while avoiding unnecessary expense by moving the data to more computationally expensive, but monetarily cheaper, storage after it is less likely to be modified (e.g., long term storage). This is merely one example, and instead the matching information can always be stored in long term, or short term, storage.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
training a machine learning model to generate queries using a training dataset comprising prior queries associated with an entity, a first category of participants, and a second category of participants;
generating, by the trained machine learning model, a set of queries, wherein the set of queries is for a different entity, and wherein the set of queries is based on the first category of participants and the second category of participants;
generating matching criteria associated with the set of queries, wherein the matching criteria relate to potential matches between participants associated with the different entity in the first category of participants and participants in the second category of participants;
providing, to a particular participant, the set of queries generated by the trained machine learning model;
defining a response time period for the particular participant to provide responses to the set of queries;
receiving, from the particular participant, responses to the set of queries during the response time period, wherein the particular participant is associated with the first category of participants and the different entity;
computing recommendation scores for the particular participant and multiple participants associated with the second category of participants and the different entity, wherein the recommendation scores are based on the matching criteria, the responses to the set of queries, and response data associated with the multiple participants;
storing the computed recommendation scores in a first storage area configured for short-term storage during the response time period;
modifying, during the response time period, at least one recommendation score of the computed recommendation scores in response to a change in the responses to the set of queries or a change in the response data associated with the multiple participants;
restricting the particular participant from providing responses to the set of queries upon an expiration of the response time period;
storing the computed recommendation scores in a second storage area configured for long-term storage upon the expiration of the response time period, wherein the first storage area configured for short-term storage during the response time period is associated with a lower computation expense than the second storage area configured for long-term storage; and
generating a notification to the particular participant of the computed recommendation scores, wherein the notification includes indications of match strength for the multiple participants associated with the second category of participants.

2. The computer-implemented method of claim 1, further comprising:
removing the computed recommendation scores from the first storage area upon the expiration of the response time period.

3. The computer-implemented method of claim 1, wherein defining the set of queries comprises determining a plurality of weights associated with the set of queries or defining relationships between queries in the set of queries.

4. The computer implemented method of claim 3, wherein the plurality of weights associated with the set of queries comprises:
a relative weight, wherein the relative weight defines an importance of a first query of the set of queries relative to a second query of the set of queries; and
an absolute weight, wherein the absolute weight defines an importance of the first query of the set of queries relative to the computed recommendation scores.

5. The computer-implemented method of claim 1, further comprising:
defining a new query after receiving the responses to the set of queries; and
dynamically modifying the matching criteria based on the new query.

6. The computer-implemented method of claim 1, wherein the set of queries includes multiple-choice queries.

7. The computer-implemented method of claim 1, further comprising:
barring a match between the particular participant and at least one participant of the multiple participants based on a characteristic of the at least one participant.

8. The computer-implemented method of claim 1, further comprising:
providing a user interface via which at least one match is displayed based on the computed recommendation scores; and
receiving a selection, via the user interface, of a participant of the multiple participants associated with the at least one match.

9. The computer-implemented method of claim 1, wherein at least one of the set of queries or the matching criteria are generated using machine learning.

10. The computer-implemented method of claim 1, wherein the received responses to the set of queries includes a response to a ranking query including ranked preferences of the particular participant, and wherein the recommendation scores are based on the response to the ranking query.

11. The computer-implemented method of claim 1, wherein generating matching criteria associated with the set of queries comprises generating a response correlation defining a relationship between one or more responses to a query of the set of queries, and wherein the response correlation defines a positive relationship, a neutral relationship, and a negative relationship.

12. A non-transitory computer-readable medium carrying instructions that, when executed by a computing system, cause the computing system to perform operations comprising:
training a machine learning model to generate queries using a training dataset comprising prior queries associated with an entity, a first category of participants, and a second category of participants;
generating, by the trained machine learning model, a set of queries the set of queries is for a different entity, and wherein the set of queries is based on the first category of participants and the second category of participants;

generating matching criteria associated with the set of queries, wherein the matching criteria relate to potential matches between participants associated with a different entity in the first category of participants and participants in the second category of participants;

providing, to a particular participant, the set of queries generated by the trained machine learning model;

defining a response time period for the particular participant to provide responses to the set of queries;

receiving, from the participant, responses to the set of queries during the response time period, wherein the particular participant is associated with the first category of participants and the different entity;

computing recommendation scores for the particular participant and multiple participants associated with the second category of participants and the different entity, wherein the recommendation scores are based on the matching criteria, the responses to the set of queries, and response data associated with the multiple participants;

restricting the particular participant from providing responses to the set of queries upon an expiration of the response time period;

storing the computed recommendation scores in a first storage area configured for short-term storage during the response time period;

modifying, during the response time period, at least one recommendation score of the computed recommendation scores in response to a change in the responses to the set of queries or a change in the response data associated with the multiple participants;

storing the computed recommendation scores in a second storage area configured for long-term storage upon the expiration of the response time period, wherein the first storage area configured for short-term storage during the response time period is associated with a lower computation expense than the second storage area configured for long-term storage; and generating a notification to the particular participant of the computed recommendation scores, wherein the notification includes indications of match strength for the multiple participants associated with the second category of participants.

13. The non-transitory computer-readable medium of claim 12, wherein the operations further comprise:
removing the computed recommendation scores from the first storage area upon the expiration of the response time period.

14. The non-transitory computer-readable medium of claim 12, wherein defining the set of queries comprises determining a plurality of weights associated with the set of queries or defining relationships between queries in the set of queries.

15. The non-transitory computer-readable medium of claim 12, wherein the operations further comprise:
defining a new query after receiving the responses to the set of queries; and
dynamically modifying the matching criteria based on the new query.

16. The non-transitory computer-readable medium of claim 12, wherein the set of queries includes multiple-choice queries.

17. The non-transitory computer-readable medium of claim 12, wherein the operations further comprise:
barring a match between the particular participant and at least one participant of the multiple participants based on a characteristic of the at least one participant.

18. The non-transitory computer-readable medium of claim 12, wherein the operations further comprise:
providing a user interface via which at least one match is displayed based on the computed recommendation scores; and
receiving a selection, via the user interface, of a participant of the multiple participants associated with the at least one match.

19. The non-transitory computer-readable medium of claim 12, wherein at least one of the set of queries or the matching criteria are generated using machine learning.

20. A system, comprising:
at least one processor; and
at least one non-transitory memory carrying instructions that, when executed by the at least one processor, cause the system to:
train a machine learning model to generate queries using a training dataset comprising prior queries associated with an entity, a first category of participants, and a second category of participants;
generate, by the trained machine learning model, a set of queries, wherein the set of queries is for a different entity, and wherein the set of queries is based on the first category of participants and the second category of participants;
generate matching criteria associated with the set of queries, wherein the matching criteria relate to potential matches between participants associated with a different entity in the first category of participants and participants in the second category of participants;
provide, to a particular participant, the set of queries generated by the trained machine learning model;
define a response time period for the particular participant to provide responses to the set of queries;
receive, from the particular participant, responses to the set of queries during the response time period, wherein the particular participant is associated with the first category of participants and the different entity;
compute recommendation scores for the particular participant and multiple participants associated with the second category of participants and the different entity, wherein the recommendation scores are based on the matching criteria, the responses to the set of queries, and response data associated with the multiple participants;
store the computed recommendation scores in a first storage area configured for short-term storage during the response time period;
modify, during the response time period, at least one recommendation score of the computed recommendation scores in response to a change in the responses to the set of queries or a change in the response data associated with the multiple participants;
restricting the particular participant from providing responses to the set of queries upon an expiration of the response time period;
store the computed recommendation scores in a second storage area configured for long-term storage upon the expiration of the response time period, wherein the first storage area configured for short-term storage during the response time period is associated with a lower computation expense than the second storage area configured for long-term storage; and generate a notification to the particular participant of the computed recommendation scores, wherein the notification includes indications of match strength for the multiple participants associated with the second category of participants.

21. The system of claim 20, wherein the instructions further cause the system to:
remove the computed recommendation scores from the first storage area upon the expiration of the response time period.

22. The system of claim 20, wherein the instructions further cause the system to:
bar a match between the particular participant and at least one participant of the multiple participants based on a characteristic of the at least one participant.

23. The system of claim 20 further comprising a display, wherein the instructions further cause the system to:
display a user interface on the display via which at least one match is displayed based on the computed recommendation scores; and
receive a selection, via the user interface, of a participant of the multiple participants associated with the at least one match.

* * * * *